United States Patent
Paka et al.

(10) Patent No.: US 11,194,868 B1
(45) Date of Patent: Dec. 7, 2021

(54) PROVIDING SUPPLEMENTAL INFORMATION IN NEWS SEARCH

(71) Applicant: Google LLC, Mountain View, CA (US)

(72) Inventors: Anand Paka, San Francisco, CA (US); Paul Brian Moody, Mountain View, CA (US); Mayuresh Saoji, Fremont, CA (US); Vikas Sukla, Sunnyvale, CA (US); Andre Rohe, Mountain View, CA (US); Richard Louis Gingras, Los Altos, CA (US); Maricia Scott, Mountain View, CA (US)

(73) Assignee: Google LLC, Mountain View, CA (US)

( * ) Notice: Subject to any disclaimer, the term of this patent is extended or adjusted under 35 U.S.C. 154(b) by 124 days.

(21) Appl. No.: 16/146,838

(22) Filed: Sep. 28, 2018

Related U.S. Application Data

(63) Continuation of application No. 14/697,549, filed on Apr. 27, 2015, now abandoned.

(60) Provisional application No. 61/986,003, filed on Apr. 29, 2014.

(51) Int. Cl.
*G06F 16/00* (2019.01)
*G06F 16/951* (2019.01)
*G06F 16/2457* (2019.01)
*G06F 16/28* (2019.01)

(52) U.S. Cl.
CPC ...... *G06F 16/951* (2019.01); *G06F 16/24578* (2019.01); *G06F 16/285* (2019.01)

(58) Field of Classification Search
CPC ............ G06F 16/3322; G06F 16/90324
USPC ............................................. 707/767, 728
See application file for complete search history.

(56) References Cited

U.S. PATENT DOCUMENTS

| | | | |
|---|---|---|---|
| 7,707,201 B2 * | 4/2010 | Kapur | G06F 16/9537 707/706 |
| 8,010,537 B2 * | 8/2011 | Prasad Kantamneni | G06F 16/90324 707/748 |
| 8,700,653 B2 * | 4/2014 | Hansson | G06F 16/3322 707/767 |
| 8,756,210 B1 * | 6/2014 | Guha | G06F 16/332 707/706 |
| 8,768,908 B2 | 7/2014 | Chowdhury et al. | |
| 10,789,305 B2 * | 9/2020 | Skrenta | G06F 16/951 707/707 |
| 2005/0114324 A1 * | 5/2005 | Mayer | G06F 16/951 707/707 |
| 2010/0161583 A1 * | 6/2010 | Sareen | G06F 16/951 707/706 |
| 2012/0011112 A1 | 1/2012 | Bian et al. | |
| 2013/0117297 A1 * | 5/2013 | Liu | G06F 16/3322 707/767 |
| 2013/0282682 A1 * | 10/2013 | Batraski | G06F 16/951 707/706 |

(Continued)

Primary Examiner — Alexandria Y Bromell
(74) *Attorney, Agent, or Firm* — Dority & Manning, P.A.

(57) ABSTRACT

In one aspect, a method includes receiving a query, identifying search results in response to the query, grouping the search results into one or more clusters, identifying similarities across the one or more clusters, determining a related topic associated with the query based on the similarities of the one or more clusters, determining a categories associated with the query, identifying supplemental information based on the related topic and the category, and providing the search results and the supplemental information for display in response to the query.

5 Claims, 4 Drawing Sheets

(56) References Cited

U.S. PATENT DOCUMENTS

| | | | |
|---|---|---|---|
| 2013/0282702 A1* | 10/2013 | Zhu | G06F 16/3322 707/723 |
| 2013/0282749 A1* | 10/2013 | Batraski | G06F 16/9535 707/767 |
| 2015/0227619 A1* | 8/2015 | Xie | G06F 16/958 707/706 |

* cited by examiner ental information based on the related topic and the category. The method comprises providing the search results and the supplemental information for display in response to the query. Other aspects can be embodied in corresponding systems and apparatus, including computer program products.

PROVIDING SUPPLEMENTAL INFORMATION IN NEWS SEARCH

CROSS-REFERENCE TO RELATED APPLICATION

The present application is a continuation of and incorporates by reference U.S. application Ser. No. 14/697,549 filed Apr. 27, 2015 which claims the benefit of U.S. Provisional Patent Application Ser. No. 61/986,003, entitled "Providing Supplementary Information In News Search," filed on Apr. 29, 2014, both of which are hereby incorporated by reference in their entirety for all purposes.

BACKGROUND

A user may search for news pertaining to a particular topic, story or category, using a query with one or more search terms. The search terms are used to provide results to the user in response to the query. However, the provided results may not always provide the user with the exact news item or story that the user is looking for. In such cases, users have to refine or extend their query and try to find their answer by trial-and-error.

SUMMARY

The disclosed subject matter relates to a machine-implemented method, comprising receiving a query and identifying search results in response to the query. The method comprises grouping the search results into one or more clusters, identifying similarities across the one or more clusters, and determining a related topic associated with the query based on the similarities of the one or more clusters. The method comprises determining a category associated with the query and identifying supplemental information based on the related topic and the category. The method comprises providing the search results and the supplemental information for display in response to the query. Other aspects can be embodied in corresponding systems and apparatus, including computer program products.

These and other aspects can include one or more of the following features. In one example, the related topic is determined by ranking the similarities of the one or more clusters, and selecting one of the similarities as the related topic based on the ranking. In one example, grouping the search results further comprises identifying search results relating to a same event. In one example, determining the category further comprises determining the category based on respective contents of each of the search results. In one example, identifying supplemental information further comprises identifying a link to a content item associated with the related topic. In one example, identifying supplemental information further comprises identifying a link to a content item associated with the category. In one example, the method further comprises modifying the search results based on using the related topic or the category as an additional search criteria for the query. In one example, the method further comprises adding content items associated with the related topic or the category to the search results. In one example, the query comprises a vertical query for content items of a specific content item type. In one example, the query comprises a query for news items. In one example, the supplemental information comprises one or more links to the one or more of the one or more topics or the one or more categories. In one example, following a link to a topic of the one or more topics causes one or more content items relating to the topic to be presented to the user.

The disclosed subject matter also relates to a system including one or more processors and a machine-readable medium comprising instructions stored therein, which when executed by the processors, cause the processors to perform operations comprising receiving a query and identifying search results in response to the query. The operations comprise grouping the search results into one or more clusters, identifying similarities across the one or more clusters, and determining a related topic associated with the query based on the similarities of the one or more clusters. The operations comprise determining a category associated with the query, identifying supplemental information based on the related topic and the category, and providing the search results and the supplemental information for display in response to the query. Other aspects can be embodied in corresponding systems and apparatus, including computer program products.

These and other aspects can include one or more of the following features. In one example, determining the related topic further comprises determining the related topic based on a topic pre-associated with a search term of the query. In one example, determining the category further comprises determining the category based on a category pre-associated with a search term of the query. In one example, determining the related topic further comprises ranking the similarities of the one or more clusters, and selecting one of the similarities as the related topic based on the ranking. In one example, grouping the search results further comprises identifying search results relating to a same event. In one example, identifying supplemental information further comprises identifying a link to a content item associated with the related topic and identifying a link to a content item associated with the category. In one example, the operations further comprise modifying the search results based on using the related topic or the category as an additional search criteria for the query.

The disclosed subject matter also relates to a machine-readable medium including instructions stored therein, which when executed by a machine, cause the machine to perform operations comprising receiving a query and identifying search results in response to the query. The operations comprise grouping the search results into one or more clusters, and identifying similarities across the one or more clusters. The operations comprise ranking the similarities of the one or more clusters, and determining, from the similarities, a related topic associated with the query based on the ranking. The operations comprise determining a category associated with the query, and identifying supplemental information based on the related topic and the category. The operations comprise providing the search results and the supplemental information for display in response to the query.

These and other features of the invention described throughout the application provide one or more advantages, including but not limited to, providing a user with supplemental information in response to a search query that provide the user with additional key terms or topics to help the user narrow the query and/or to expand the query to other topics that the user may find of interest in view of the results of the query.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
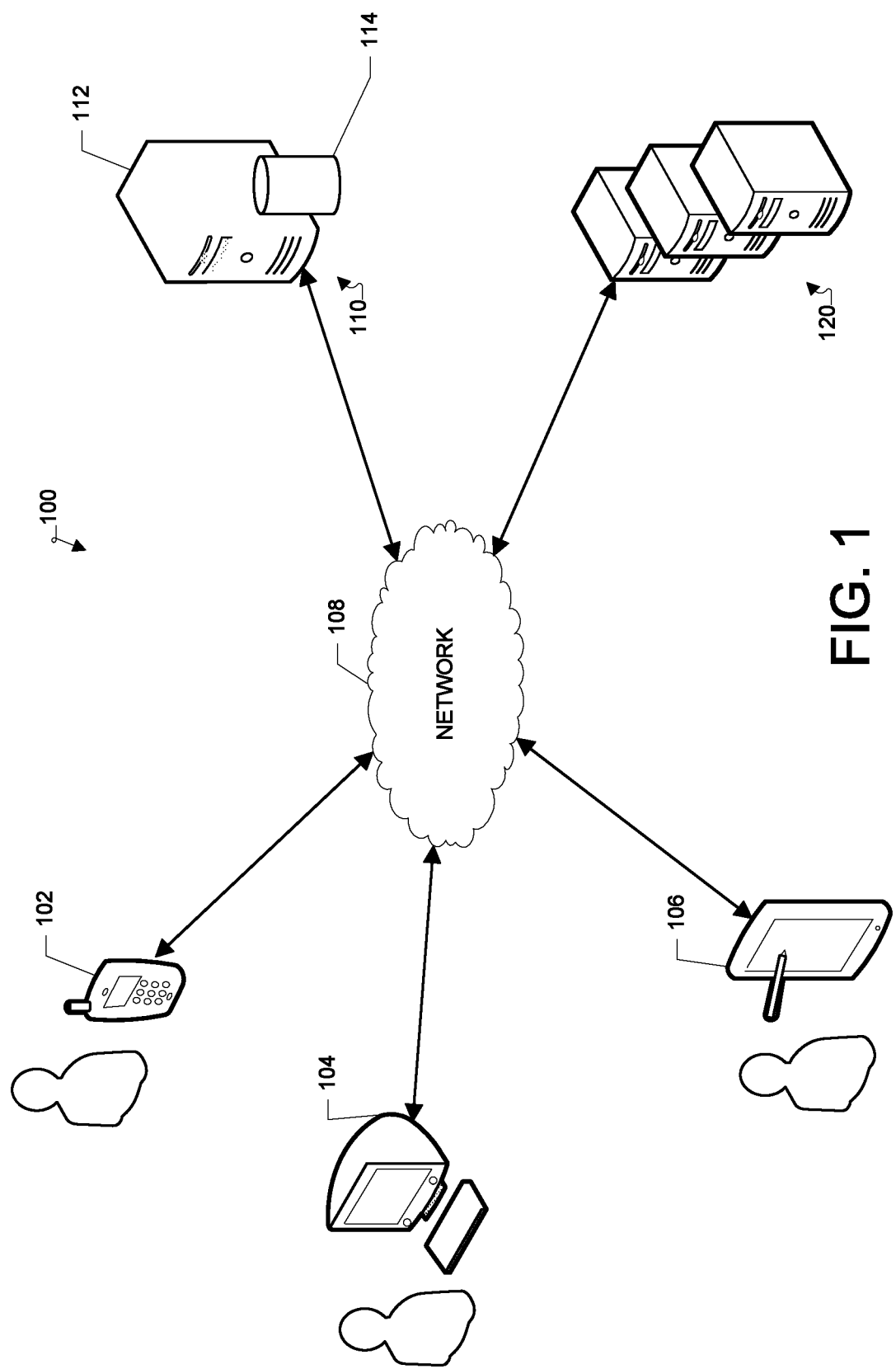
FIG. 1 illustrates an example client-server network environment, which provides for providing supplemental information to a user in response to a search query.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

When providing search results to a user in response to a query, the user may benefit from supplemental information that provide the user with additional key terms or topics to help the user narrow the query and/or to expand the query to other related topics that the user may find of interest in view of the results of the query. The subject disclosure provides a system and method for providing supplemental information to a user in response to a user search query. In one example, the search results may be provided by a vertical search engine. A vertical search engine (e.g., as opposed to a general search engine) focuses on a specific segment of online content. The vertical content area may be based on topicality, media type, or genre of content. For example, the vertical content area may include news, books, images, videos or other vertical content provided by a vertical mode of search. For example purposes, the system and method for providing supplemental information are described herein with respect to a news search. However, it should be understood by one of ordinary skill in the art that same or similar methods and processes can be applied to any vertical mode of search and/or general search.

In one example, in response to a query by the user for content items (e.g., news items), supplemental information pertaining to the query is provided to the user. The supplemental information may include a set of related topics. The related topics may include one or more terms or phrases, to supplement the user's existing query. In one example, each related topic (e.g., term or phrase) may provide a further search term or phrase for the query to provide more specific search results (e.g., search results that narrow the query to more specific set of content items). The related topics may be identified based on the user query and/or the search results retrieved in response to the query. The related topics may include topics to narrow the search to more specific topics and/or provide the user with more specific subtopics of a general topic. Links to the related topics may be presented to the user. The links may provide the user with a new or updated search result set, where the related topic is used as a further search term for the query. In one example, the related topics may be identified based on the content of the content items (e.g., news items) returned in response to the original user query.

In some examples, the supplemental information may also include additional content items relating to the same category as the results of the user query. For example, the supplemental information may include other news relating to the same category as news items or news collections returned for display to the user in response to the query. In one example, the user query may result in a set of content items (e.g., news items) being retrieved and returned to the user. In one example, the content items may be associated with one or more categories. For example, the category of the retrieved content items may be determined according to the content of the content item(s). For example, with respect to a news item, the category may include world news, US news, sports news, or other news category. In one example, the categories for all or a set of content items being returned to the user is determined, and the categories are ranked according to one or more criteria, including for example, the extent to which the match the search query, the number of returned content items related to the category, the extent to which each news item relates to the category, or other similar criteria. In one example, a set of categories are selected, for example, according to the ranking. In some instances, an additional set of content items associated with the categories is provided for display to the user. In one example, the additional set of content items is identified according to one or more criteria, including the popularity of the content items, the recency of the content items, the relevancy of the content items, or other similar criteria.

FIG. 1 illustrates an example client-server network environment, which provides for providing supplemental information to a user in response to a search query. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In some implementations, server 110 includes a processing device 112 and a data store 114. Processing device 112 executes computer instructions stored in data store 114, for example, to facilitate providing supplemental information relating to a user search query for display to a user interacting with electronic devices 102, 104, 106. Server 110 may further be in communication with remote servers 120 either through the network 108 or through another network or communication means.

According to some aspects, remote servers 120 can be any system or device having a processor, a memory and communications capability for hosting various social networking services. In one example, the remote servers 120 may host various services including search engines, content databases (e.g., news databases), or other services for facilitating providing search results and/or supplemental information to a user in connection with Server 110.

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through various communication protocols. In some aspects, client devices 102, 104, 106, server 110 and/or one or more remote servers 120 may communicate wirelessly through a communication interface (not shown), which may include digital signal processing circuitry where necessary. The communication interface may provide for communications under various modes or protocols, including Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including using a Bluetooth, WiFi, or other such transceiver.

Users may interact with the system hosted by server 110, and/or one or more services hosted by remote servers 120, through a client application installed at the electronic devices 102, 104, and 106. Alternatively, the user may interact with the system and/or services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
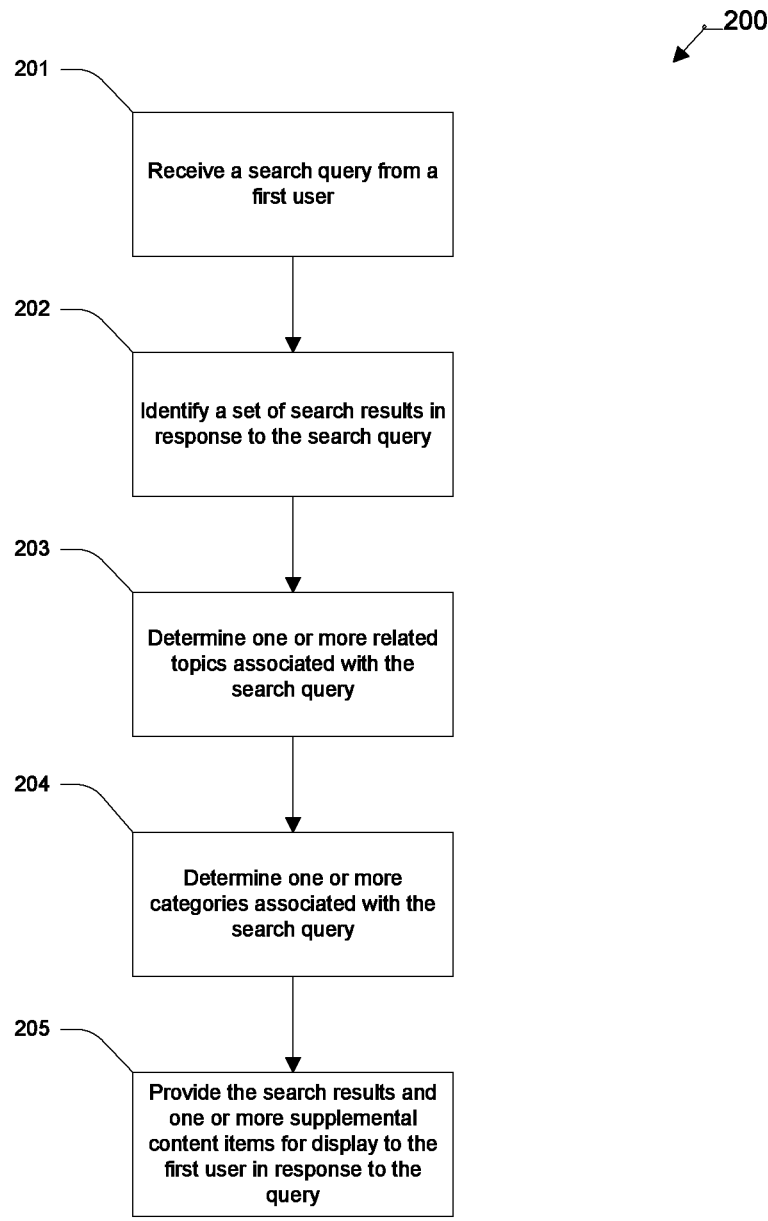
FIG. 2 illustrates a flow diagram of an example process for providing supplemental information to a user in response to a search query.

FIG. 2 illustrates a flow diagram of an example process 200 for providing supplemental information to a user in response to a search query. In step 201, a search query is received from a user. In one example, the search query comprises a search request for content at a vertical search engine, such as a news search engine. In one example, the search query comprises one or more search terms or phrases, and/or other criteria for retrieving content items.

In step 202, a set of search results are identified in response to the search query. In one example, the search results include content items that meet one or more criteria according to the search query. For example, the content items are identified when they contain the one or more search term or phrases provided by the user. In another example, the content items may be tagged with one or more associated terms, and the tagged terms may match the search term or phrases. In one example, the content items are ranked in an order based on a score. The score may for example, be calculated based on one or more criteria, including recency of the content item, and/or relevancy of the news item to the search query criteria. In some examples, the search results may be grouped and presented as a collection (e.g., one or more clusters). For example, content items may be clustered according to their content and/or topic, and may be provided to the user as a collection.

In step 203, one or more related topics associated with the search query are determined. In one example, the results that are identified in response to the user query may not suffice in providing the user with the specific content items the user wishes to see (e.g. user types 'shooting' to find LAX airport shooting news, but gets results for New Jersey mall shooting). In such cases, a user may refine or extend the search to find the specific content items the user wishes to see (e.g., through trial and error). By providing supplemental information, in addition to the search results in response to the user query, the user is able to branch off from their query, and find the desired content more easily (e.g. provide a related link for "new jersey shooting").

In one example, related topics may include terms and phrases related to the query. For example, terms and phrases related to the user query may be determined. For example, if a user searches for "obama", one or more related topics such as "obamacare," and "michelle obama," may be identified and provided to the user. In one example, links associated with each additional search term or phrase representing a related topic may be generated. Each link may be associated with a set of results to allow the user to explore new topics or related content. In one example, each new related topic is used as an additional search criteria, and a set of results (e.g., for a query including one or more of the original criteria specified by the user query and/or the additional criteria relating to the related topic) may be identified and associated with the related topic and/or the link.

In one example, to find the related topics, the content items retrieved in view of the search results may be clustered. For example, a clustering technique may be used that identifies similarities in content, topic, genre, date of generation, and/or other criteria to determine clusters of content items. In one example, a clustering technique may group content items relating to or covering the same topic (e.g., all articles relating to the same news event). Next, common terms in each cluster are identified in each cluster. For example, with respect to news items, various articles may be clustered based on the news story or event being covered by the news items. In one example, a set of keywords common across content items within a cluster is determined. In one example, these keywords or phrases constitute the related topics for a cluster. In one implementation, each group of content items may be associated with a set of related topics. In some examples, a set of content items of the search results (e.g., a group, cluster or other subset) may be associated with a set of related topics generated according to common key terms or phrases. In one example, the related topics for one or more sets of the search results and/or individual content items are identified. One or more of the related topics may be selected as the related topics associated with the identified one or more content items. The related topics may be ranked according to various criteria including popularity, relevance, frequency, recency and/or other criteria, in one example. The related topics associated with the search results may be selected according to the ranking.

In step 204, one or more categories associated with the search query may be identified. In some instances, a user may receive a set of search results as a result of the user query and upon review of the search results, the user may become interested in other content items linked or associated with the content items identified as result of the query (e.g., other news items related to the news items returned in response to the user query). In one example, the search results may belong to different groupings or categories, including for example, genre, section, author, geographical vicinity, etc. For example, with regard to news items, stories from the same country, involving the same people or places, or belonging in the same category (e.g. business news) may be identified as being related. In one example, for news items, the category may further include section indications, for example, based on the section of a periodical that the news story falls under. When the user becomes interested in a certain category of content items provided as search results, and wishes to explore more related content items, the user may have to issue a different query to get results on the associated category. By offering supplemental content items in the same or similar category as one or more content items provided to the user in response to their query, the user is provided with a more fluid experience where the user can explore other related news.

In one example, a category for a query is identified. For example, if a user searches for "obama", the category US news, or world news may be identified. In some examples, multiple categories may be identified for a query. In one example, the one or more categories may be identified according to the search query (e.g., the search term or phrases) and/or content of the search results retrieved in response to the search query. In another example, each content item may be associated with one or more categories, and one or more common categories may be identified. In some examples, the one or more search terms or phrases provided in the query may be associated with categories used to determine the one or more categories. In one example, the categories can be identified and provide as a link to the user, where each link directs the user to a set of content items in the same category. In another example, a set of content items in one or more categories associated with the search results may be selected and provided for display to the user.

In step 205, the search results and one or more supplemental content items are provided for display to the user in response to the query of step 201. In one example, the supplemental information may include one or more links. For example, links to one or more related topics may be provided. In addition, links to content items within the same category as the search query and/or search results may be provided.

Figure 3:
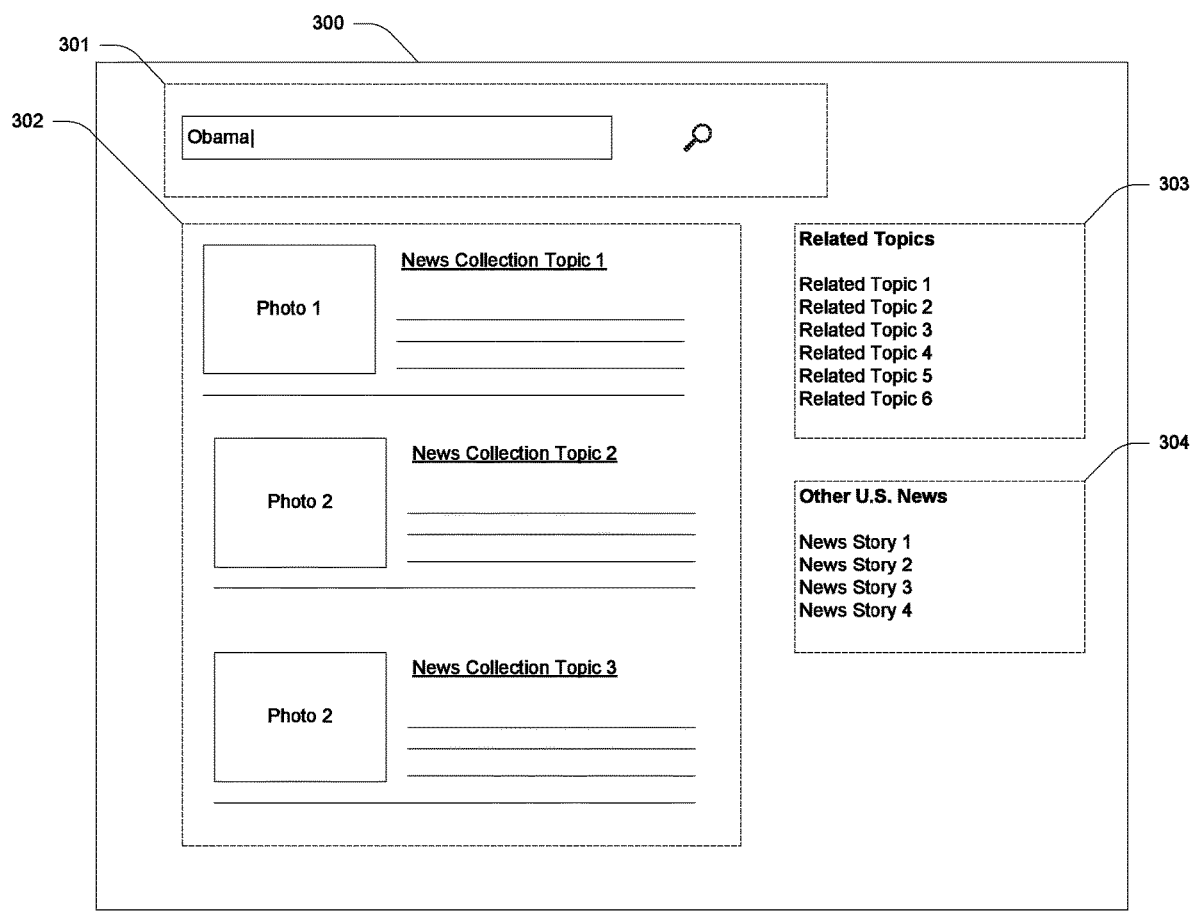
FIG. 3 illustrates a screen shot of an example graphical user interface providing news content items and supplemental information for display to a user in response to a search query.

FIG. 3 illustrates a screen shot of an example graphical user interface 300 providing news content items and supplemental information for display to a user in response to a search query. As illustrated, a user provides a search query by entering one or more search terms or phrase and/or other criteria in the search area 301 (e.g., including a search box and other criteria indicators). In response to the search query, a set of search results are identified and displayed within the search results area 302. In addition, one or more related topics are identified, and links to the related topics are displayed in related topics area 303. Furthermore, a supplemental content area 304 may provide links to one or more additional content items relating to the same category as the search results and/or the search query.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
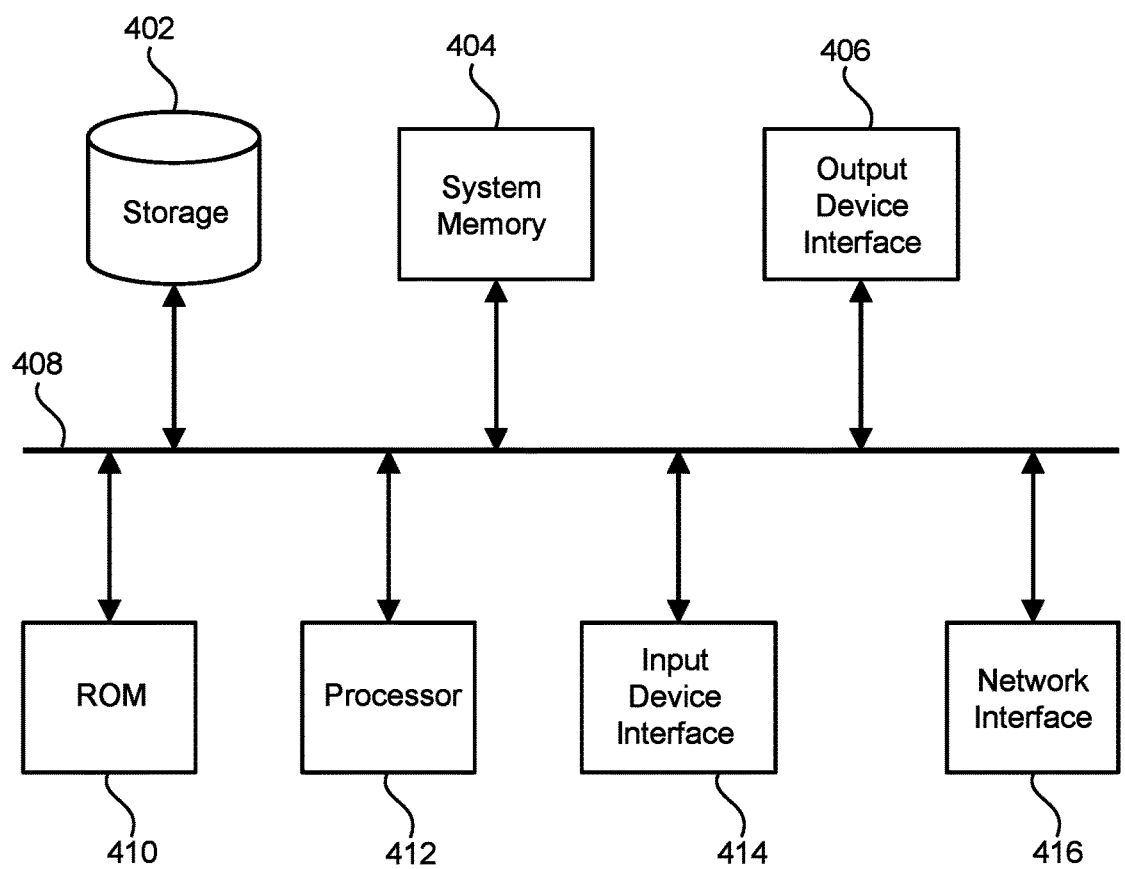
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for providing supplemental information in response to a user query according to various implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method, for providing supplemental information in response to a search query comprising:

receiving, by a computing system comprising one or more computing devices, a search query comprising criteria for retrieving a set of search results, wherein the criteria comprises one or more search terms or phrases;

retrieving, by the computing system, the set of search results from a vertical search engine, wherein the vertical search engine comprises a news search engine, wherein the set of search results comprise one or more content items that meet one or more criteria of the search query;

identifying, by the computing system, one or more similarities between the one or more content items of the set of search results, wherein the one or more similarities comprise at least one of a similar content, a similar topic, a similar genre, or a similar date of generation;

generating, by the computing system, one or more search clusters based on the one or more similarities between the one or more content items, wherein each of the one or more search clusters comprise at least one of the one or more content items;

identifying, by the computing system, one or more common terms associated with each of the one or more search clusters, wherein the one or more common terms associated with each search cluster comprise keywords common across the at least one content items of the search cluster;

determining, by the computing system, a plurality of related topics, wherein the plurality of related topics comprise a set of related topics for each search cluster in the one or more search clusters, wherein the set of related topics associated with each search cluster is based on the one or more common terms associated with the search cluster;

selecting, by the computing system, one or more search related topics from the plurality of related topics;

determining, by the computing system, supplemental search criteria for each search related topic in the one or more search related topics;

identifying, by the computing system, a set of topic search results for each search related topic based on the search query and the supplemental search criteria for the search related topic;

generating, by the computing system, supplemental information associated with the search query, wherein the supplemental information comprises the one or more search related topics and a topic link for each of the one or more search related topics, wherein the topic link for each search related topic directs a user to the set of topic search results associated with the search related topic;

identifying, by the computing system, one or more news categories associated with the search query, wherein the one or more news categories are predefined news categories, and wherein the one or more news categories are at least one of world news, US news, or sports news; and providing, by the computing system, the set of search results, the one or more news categories, and the supplemental information for display simultaneously, wherein the set of search results is provided in a search results area, and the one or more news categories and the supplemental information are provided in a supplemental content area separate from the search results area.

2. The computer-implemented method of claim 1, wherein the one or more news categories are provided for display with a category link associated with each news category in the one or more news categories, wherein the category link for each news category in the one or more news categories directs a user to one or more content items associated with the news category.

3. The computer-implemented method of claim 1, wherein at least one of the one or more news categories comprise a section of a periodical associated with the search query.

4. The computer-implemented method of claim 1, wherein selecting one or more search related topics from the plurality of related topics comprises:

determining, by the computing system, a ranking for each related topic in the plurality of related topics; and selecting, by the computing system, the one or more search related topics based at least in part on the ranking for each related topic in the plurality of related topics.

5. The computer-implemented method of claim 4, wherein the ranking for a respective related topic in the plurality of related topics is determined based on at least one of a popularity, a relevance, a frequency, or a recency associated with the respective related topic.

* * * * *